(12) United States Patent
Kumagai et al.

(10) Patent No.: US 7,862,320 B2
(45) Date of Patent: Jan. 4, 2011

(54) THREE-DIMENSIONAL OBJECT FORMING APPARATUS AND METHOD FOR FORMING THREE DIMENSIONAL OBJECT

(75) Inventors: Toshio Kumagai, Shiojiri (JP); Kazutoshi Fujisawa, Okaya (JP); Akio Ito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/174,416

(22) Filed: Jul. 16, 2008

(65) Prior Publication Data
US 2009/0020920 A1    Jan. 22, 2009

(30) Foreign Application Priority Data
Jul. 17, 2007  (JP) ............................. 2007-185316
May 30, 2008  (JP) ............................. 2008-142239

(51) Int. Cl.
B29C 67/00 (2006.01)
B29C 31/04 (2006.01)
B29C 35/08 (2006.01)
G06F 19/00 (2006.01)

(52) U.S. Cl. .................... 425/174.4; 264/308; 264/463; 264/401; 264/497; 425/375; 700/119

(58) Field of Classification Search .............. 425/174.4, 425/375; 264/463, 308, 410, 401, 497
See application file for complete search history.

(56) References Cited

U.S. PATENT DOCUMENTS

| | | | | |
|---|---|---|---|---|
| 4,961,154 A | * | 10/1990 | Pomerantz et al. ........... 345/419 |
| 5,137,662 A | * | 8/1992 | Hull et al. .................... 264/401 |
| 5,171,490 A | * | 12/1992 | Fudim ......................... 264/401 |
| 5,248,456 A | * | 9/1993 | Evans et al. .................. 264/401 |
| 5,352,405 A | * | 10/1994 | Beaman et al. ............... 419/45 |
| 5,529,473 A | * | 6/1996 | Lawton et al. ............ 425/174.4 |
| 5,573,721 A | * | 11/1996 | Gillette ........................ 264/401 |
| 5,573,722 A | * | 11/1996 | Hull ............................ 264/401 |
| 5,578,155 A | * | 11/1996 | Kawaguchi .................. 156/267 |
| 5,837,960 A | * | 11/1998 | Lewis et al. ............. 219/121.63 |
| 6,027,682 A | * | 2/2000 | Almquist et al. ............ 264/401 |

(Continued)

FOREIGN PATENT DOCUMENTS

JP    2001-150556    6/2001

(Continued)

*Primary Examiner*—Joseph S Del Sole
*Assistant Examiner*—Nahida Sultana
(74) *Attorney, Agent, or Firm*—Workman Nydegger

(57) ABSTRACT

A three-dimensional object forming apparatus forms a three-dimensional object by binding powder particles with a curable liquid. The apparatus includes a powder layer forming unit that spreads a powder to a uniform thickness to form a powder layer. A curable liquid ejection head ejects the curable liquid to the powder layer through an ejection nozzle. A sectional data producing device produces sectional data at each of a plurality of cross sections of a desired three-dimensional object according to shape data of the desired three-dimensional object. A cross-sectional member forming section is also included by which cross-sectional members are formed by ejecting the curable liquid to the powder layer from the curable liquid ejection head according to the sectional data and thus binding the powder layer. The cross-sectional member forming section includes a permeation rate controller controlling the permeation rate of the curable liquid to the powder layer.

13 Claims, 9 Drawing Sheets

U.S. PATENT DOCUMENTS

| | | | |
|---|---|---|---|
| 6,129,884 A * | 10/2000 | Beers et al. | 264/401 |
| 6,554,600 B1 * | 4/2003 | Hofmann et al. | 425/174.4 |
| 6,841,340 B2 * | 1/2005 | Tani | 430/320 |
| 6,896,839 B2 * | 5/2005 | Kubo et al. | 264/460 |
| 7,540,738 B2 * | 6/2009 | Larsson et al. | 425/375 |
| 2002/0053750 A1 * | 5/2002 | Schwaighofer | 264/46.4 |
| 2004/0134588 A1 * | 7/2004 | Gerken et al. | 156/78 |
| 2005/0274772 A1 * | 12/2005 | Nelson et al. | 228/101 |
| 2006/0145381 A1 * | 7/2006 | Larsson | 264/40.6 |
| 2007/0026145 A1 * | 2/2007 | Lindemann et al. | 427/248.1 |
| 2007/0298182 A1 * | 12/2007 | Perret et al. | 427/427.3 |
| 2008/0128956 A1 * | 6/2008 | Perret | 264/497 |
| 2008/0169587 A1 * | 7/2008 | Kihara et al. | 264/408 |
| 2009/0184444 A1 * | 7/2009 | Honda et al. | 264/401 |

FOREIGN PATENT DOCUMENTS

| | | |
|---|---|---|
| JP | 2003-246054 | 9/2003 |
| JP | 2004-291625 | 10/2004 |
| JP | 2004-330702 | 11/2004 |
| JP | 2005-067138 | 3/2005 |
| JP | 2002-307562 | 7/2008 |

* cited by examiner

THREE-DIMENSIONAL OBJECT FORMING APPARATUS AND METHOD FOR FORMING THREE DIMENSIONAL OBJECT

BACKGROUND

1. Technical Field

The present invention relates to techniques for forming three-dimensional objects, and more specifically a technique for forming a three-dimensional object by ejecting a curable liquid to bind particles of powder material (powder).

2. Related Art

A technique has been known in which a three-dimensional object is formed by binding powder with a curable liquid. In this technique, the following procedure is repeated to form the three-dimensional object. First, a powder is spread to a uniform thickness to form a powder layer. Then, a curable liquid is ejected to desired positions of the powder layer to bind the powder particles. Consequently, only the portions of the powder layer to which the curable liquid has been ejected is bound, thereby forming a thin plate. This thin plate is hereinafter referred to as a "cross-sectional member". Subsequently, another powder layer is formed to a small thickness on the previously formed powder layer, and the curable liquid is ejected to desired positions of the powder layer. Consequently, the portions of the new powder layer to which the curable liquid has been ejected are formed into a new cross-sectional member. Thin plate-like cross-sectional members are thus stacked one on top of another, thereby forming a three-dimensional object.

This three-dimensional object forming technique can easily be performed by binding a powder without preparing a die or mold as long as three-dimensional data of a desired form can be obtained. Accordingly, a three dimensional body can be quickly formed at a low cost. Since in the technique, thin plate-like cross-sectional members are stacked one on top of another, even a complicated shape having an internal structure can be integrally formed without assembling a plurality of parts, as described in Japanese Unexamined Patent Application Publication No. 2002-307562.

It is however difficult to form a three-dimensional object having smooth surfaces by this technique. More specifically, the curable liquid ejected to the powder layer permeates the powder in the depth direction and is simultaneously diffused in the transverse direction. Since the curable liquid does not uniformly permeate or diffuse, the surfaces of the object become rough. Also, the curable liquid permeating among the powder particles may be cured in a protruding manner, or powder particles not completely bound may fall off to form a recess in the object. The characteristics of the resulting object can be varied depending on the variation in binding rate (curing rate of the curable liquid). When the curable liquid can rapidly be cured, the powder can be bound so tightly that the resulting object is not easily deformed by some external force. However, the object is easily broken by a large external force. When the curing rate of the curable liquid is low, the resulting body is not easily broken by a large external force, but is liable to be deformed by a relatively small external force.

SUMMARY

Accordingly, an advantage of some aspect of the invention is that it provides an apparatus and a method for forming a three dimensional object can solve the above-described problems.

According to an aspect of the invention, a three-dimensional object forming apparatus is provided which forms a three-dimensional object by binding powder particles with a curable liquid. The apparatus includes a powder layer forming unit that spreads a powder to a uniform thickness to form a powder layer, and a curable liquid ejection head that ejects the curable liquid to the powder layer. The curable liquid ejection head includes an ejection nozzle through which the curable liquid is ejected. The apparatus also includes a sectional data producing device producing sectional data at each of a plurality of cross sections of an intended three-dimensional object according to shape data of the intended three-dimensional object. A cross-sectional member forming section is also included in which cross-sectional members are formed by ejecting the curable liquid to the powder layer from the curable liquid ejection head according to the sectional data and thus binding the powder layer. The cross-sectional member forming section includes a permeation rate controller controlling the permeation rate of the curable liquid to the powder layer.

The three dimensional object forming apparatus produces sectional data at each of a plurality of cross sections of a desired three-dimensional object according to the shape data of the desired three-dimensional object before forming the three-dimensional object. Then, a powder is spread to a uniform thickness to form a powder layer, and a curable liquid is ejected to the powder layer from a curable liquid ejection head according to the sectional data. The particles of the powder are bound together by the curable liquid. By ejecting the curable liquid to the powder layer, a member having a shape corresponding to a cross section taken along a plane of the three-dimensional object (cross-sectional member) is formed to a thickness corresponding to the thickness of the powder layer. In this state, another powder layer is formed on the cross-sectional member made of the powder layer. The curable liquid is ejected to the subsequently formed powder layer according to the sectional data to form a new cross-sectional member. Thus, the cross-sectional members are stacked one on top of the other. By repeating the above procedure, the three-dimensional object is formed. For forming the cross-sectional member, the rate of permeation of the curable liquid to the powder layer is controlled. By controlling the permeation rate of the curable liquid, surface roughness of the three-dimensional object can be prevented.

The curable liquid ejection head may ejects the curable liquid to the powder layer while reciprocally moving over the powder layer, and the cross-sectional members are formed so as to be stacked one on top of another in the cross-sectional member forming section. The curable liquid ejection head ejects a plurality of droplets of the curable liquid to each position thereunder in a plurality of series of ejection while reciprocally moving, in such a manner that the droplets ejected in a subsequent series of ejection land between the droplets ejected in a previous series of ejection.

For forming the cross-sectional member, in this embodiment, the curable liquid ejection head ejects a plurality of droplets of the curable liquid to each position under the head in a plurality of series of ejection in such a manner that the droplets ejected in a subsequent series land between the droplets ejected in a previous series of ejection. The droplets ejected in a previous series of ejection interfere with the course of the droplets ejected in a subsequent series of ejection. The subsequently ejected droplets do not diffuse widely, and consequently permeate predominantly in the depth direction. If the size of the droplets ejected in the previous series is reduced, the spread in the lateral direction can be reduced even in the previous series of ejection, and the droplets ejected in the subsequent series can predominantly permeate in the depth direction. Consequently, surface roughness resulting from the droplets spreading in the lateral direction can be prevented.

The curable liquid ejection head may eject droplets of the curable liquid to every other position along the moving direction thereof while reciprocally moving.

Thus, the droplets of the subsequent series can be ejected between the positions where the droplets have been ejected, so that the curable liquid can permeate efficiently in the depth direction. In addition, ejection to every other position means that droplets are ejected in two series. It is preferable that the number of series of ejection be small from the viewpoint of the speed of forming a three-dimensional object. In this sense, two series is the smallest of the plural numbers and the ejection in two series can form a smooth surface while preventing the speed of forming the three-dimensional object from being reduced as much as possible.

The curable liquid ejection head may eject droplets of the curable liquid while moving forward and moving backward.

Since, in this instance, the curable liquid ejection head ejects the curable liquid while reciprocally moving over the powder layer, a required amount of curable liquid can be efficiently applied in a short time by ejection during both forward moving and backward moving. As a result, the three-dimensional object can be formed rapidly.

The curable liquid ejection head may eject droplets of the curable liquid while reciprocally moving in the direction intersecting the direction in which the powder layer is formed.

The curable liquid can be ejected to the end of the powder layer by reciprocal movement of the curable liquid ejection head immediately after the powder layer is formed, and the cross-sectional member is thus formed. Hence, the cross-sectional member can be efficiently formed in a short time even if the curable liquid is ejected from the curable liquid ejection head in several series of ejection. As a result, a three-dimensional object can be rapidly formed.

The curable liquid ejection head may eject droplets of the curable liquid such that the droplets ejected in a previous series of ejection are smaller than the droplets ejected in a subsequent series of ejection.

Since the droplets of the previous series of ejection are smaller than those of the subsequent series of ejection, the powder particles can be bound together at only the upper portion of the powder layer, and thus binding not only in the depth direction, but also in the lateral direction can be retarded.

The cross-sectional member forming section may further include a curing rate controller that controls the curing rate of the curable liquid ejected to the powder layer.

By controlling the curing rate of the curable liquid with a curing rate controller, the characteristics of the resulting three-dimensional object can be uniformized.

The curable liquid may be cured by irradiation with electromagnetic waves, and the curing rate controller includes an electromagnetic wave emitting unit that emits electromagnetic waves to the powder layer to which the curable liquid has been applied.

In this structure, the curing rate of the curable liquid is controlled by controlling electromagnetic waves emitted from an electromagnetic wave emitting unit.

The curing rate controller may further include a retarding member between the electromagnetic wave emitting unit and the powder layer to retard the transmission of the electromagnetic waves.

The retarding member facilitates the control of the amount of irradiation with electromagnetic waves.

The curable liquid may be cured by irradiation with UV light and the electromagnetic wave emitting unit emits UV light. The retarding member retards the transmission of UV light.

In this structure, the curing rate of the curable liquid is controlled by controlling the amount of UV light emitted from the UV light emitting unit, and by adjusting the amount of UV irradiation with the retarding member.

The curable liquid may be cured by heating, and the curing rate controller includes a heater that heats the powder layer to which the curable liquid has been applied.

In this structure, the curing rate can be controlled by controlling the heating temperature.

The curable liquid ejection head may eject curable liquids having different curing rates and the curable liquid ejected in a subsequent series of ejection has a lower curing rate than the curable liquid ejected in a previous series of ejection.

In this structure, the previously ejected curable liquid and the subsequently ejected curing liquid can be simultaneously cured in the powder layer. Consequently, the curing rate can be controlled and its variation can be reduced.

According to another aspect of the invention, a method for forming a three-dimensional object by binding powder with a curable liquid is provided. The method includes spreading a powder to a substantially uniform thickness to form a powder layer, producing sectional data of a desired three-dimensional object at each of a plurality of cross sections according to the shape data of the desired three-dimensional object, and forming a cross-sectional member by ejecting the curable liquid to the powder layer from a curable liquid ejection head having ejection nozzles according to the sectional data under control of the permeation rate of the ejected curable liquid to the powder layer, thus binding the powder of the powder layer.

In this method, shape data are produced at each of a plurality of cross sections of a desired three-dimensional object according to the shape date of the desired three-dimensional object before forming the three-dimensional object. Then, a powder is spread to a uniform thickness to form a powder layer, and a curable liquid is ejected to the powder layer from the curable liquid ejection head according to the sectional data. The particles of the powder are bound together by curable liquid. By ejecting the curable liquid to the powder layer, a member having a shape corresponding to a cross section taken along a plane of the three-dimensional object (cross-sectional member) is formed to a thickness corresponding to the thickness of the powder layer. In this state, another powder layer is formed on the cross-sectional member made of the powder layer. The curable liquid is ejected to the subsequently formed powder layer according to the sectional data to form a new cross-sectional member. Thus, the cross-sectional members are stacked one on top of another. By repeating the above procedure, the three-dimensional object is formed. For forming the cross-sectional member, the rate of permeation of the curable liquid to the powder layer is controlled. By controlling the permeation rate of the curable liquid, surface roughness of the three-dimensional object can be prevented.

Preferably, spreading the powder and forming the cross sectional member are repeated to form a plurality of cross sections so as to be stacked one on top of another, and the curable liquid ejection head ejects a plurality of droplets of the curable liquid to each position thereunder in a plurality of series of ejection while reciprocally moving over the powder layer according to the sectional data, in such a manner that droplets ejected in a subsequent series of ejection land between droplets ejected in a previous series of ejection.

For forming the cross-sectional member, in this embodiment, the curable liquid ejection head ejects a plurality of droplets of the curable liquid to each position under the head in a plurality of series of ejection in such a manner the droplets ejected in a subsequent series land between the droplets ejected in a previous series of ejection. The droplets ejected in a previous series of ejection interfere with the course of the droplets ejected in a subsequent series of ejection. The subsequently ejected droplets do not diffuse widely, and consequently permeate predominantly in the depth direction. If the size of the droplets ejected in the previous series is reduced, the spread in the lateral direction can be reduced even in the previous series of ejection, and the droplets ejected in the subsequent series can predominantly permeate in the depth direction. Consequently, surface roughness resulting from the droplets spreading in the lateral direction can be prevented.

The curable liquid ejection head may eject droplets of the curable liquid to every other position along the moving direction thereof.

Thus, the droplets of the subsequent series can be ejected between the positions where the droplets have been ejected, so that the curable liquid can permeate efficiently in the depth direction. In addition, ejection to every other position means that droplets are ejected in two series. It is preferable that the number of series of ejection be small from the viewpoint of the speed of forming a three-dimensional object. In this sense, two series is the smallest of the plural numbers and the ejection in two series can form a smooth surface while preventing the speed of forming the three-dimensional object from being reduced as much as possible.

The curable liquid ejection head may eject droplets of the curable liquid while moving forward and moving backward.

Since, in this instance, the curable liquid ejection head ejects the curable liquid while reciprocally moving over the powder layer, a required amount of curable liquid can be efficiently applied in a short time by ejection during both forward moving and backward moving. As a result, the three-dimensional object can be formed rapidly.

The curable liquid ejection head may eject droplets of the curable liquid while reciprocally moving the direction intersecting the direction in which the powder layer is formed.

The curable liquid can be ejected to the end of the powder layer by reciprocal movement of the curable liquid ejection head immediately after the powder layer is formed, and the cross-sectional member is thus formed. Hence, the cross-sectional member can be efficiently formed in a short time even if the curable liquid is ejected from the curable liquid ejection head in several series of ejection. As a result, a three-dimensional object can be rapidly formed.

The curable liquid ejection head may eject droplets of the curable liquid such that the ejected droplets in a previous series of ejection are smaller than the droplets ejected in a subsequent series of ejection.

Since the droplets of the previous series of ejection are smaller than those of the subsequent series of ejection, the powder particles can be bound together at only the upper portion of the powder layer, and thus binding not only in the depth direction, but also in the lateral direction can be retarded.

Forming the cross-sectional member may include controlling the curing rate of the curable liquid ejected to the powder layer.

By controlling the curing rate of the curable liquid, the characteristics of the resulting three-dimensional object can be uniformized.

The curable liquid may be cured by irradiation with electromagnetic waves, and forming the cross-sectional member further includes irradiating with electromagnetic waves the powder layer to which the curable liquid has been applied.

Thus, the curing rate of the curable liquid can be controlled by controlling the amount of electromagnetic waves emitted from an electromagnetic wave emitting unit.

The electromagnetic waves may be UV light, and the curable liquid is cured by irradiation with UV light.

Thus, the curing rate of the curable liquid can be controlled by controlling the amount of UV light emitted from the UV light emitting unit.

The curable liquid may be cured by heating, and forming the cross-sectional member may include heating the powder layer to which the curable liquid has been applied.

Thus, the curing rate can be controlled by controlling the heating temperature.

The curable liquid ejection head may eject curable liquids having different curing rates and the curable liquid ejected in a previous series has a higher curing rate than the curable liquid ejected in a subsequent series.

Thus, the previously ejected curable liquid and the subsequently ejected curing liquid can be simultaneously cured in the powder layer. Consequently, the curing rate can be controlled and its variation can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described in the following order to be understood clearly:
A-1: Structure of the apparatus according to the first embodiment
B-1: Method for forming according to the first embodiment

A-1: Structure of the Apparatus According to the First Embodiment

Figure 1:
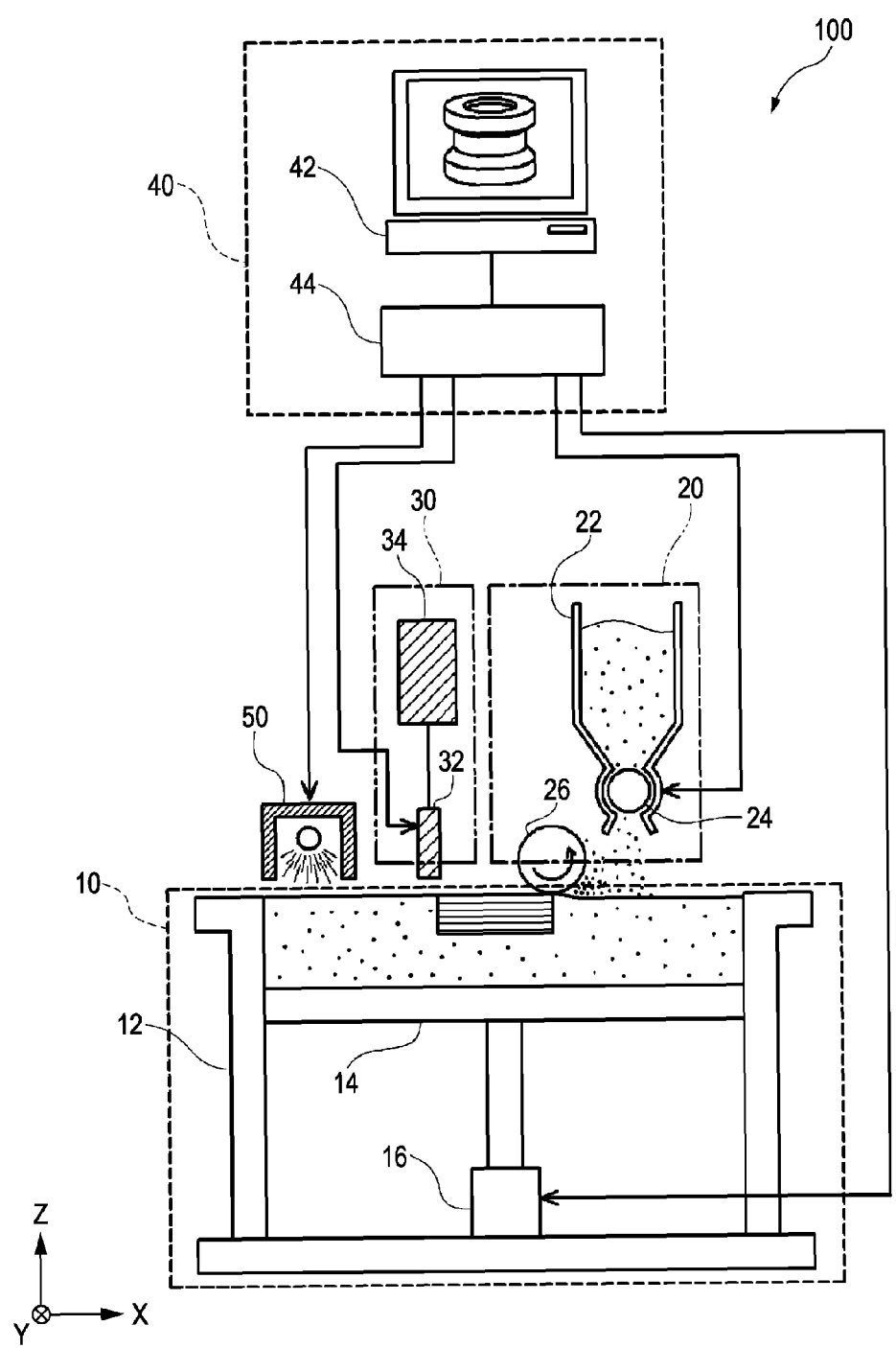
FIG. 1 is a schematic representation of the structure of a three-dimensional object forming apparatus according to a first embodiment of the invention.

FIG. 1 is a schematic representation of a three-dimensional object forming apparatus 100 according to the present embodiment. As shown in FIG. 1, the three-dimensional object forming apparatus 100 includes an object forming section 10 defined by a large frame in which a three-dimensional object is formed, a powder layer forming unit 20 forming a powder layer of a powder in the object forming section 10, a curable liquid supply unit 30 supplying a curable liquid to the powder layer to binding the powder, a UV light emitting unit 50 irradiating the curable liquid applied to the powder layer with UV light to cure the curable liquid, and an arithmetic processing section 40 performing various calculations to control all the operations of the three-dimensional object forming apparatus 100.

The arithmetic processing section 40 includes a sectional data producing device 42 that stores the shape data of an intended three-dimensional object to be formed and produces sectional data at each of a plurality of cross sections of an intended three-dimensional object, and a control device 44 that controls the operations of the object forming section 10, the powder layer forming unit 20, the curable liquid supply unit 30 and so forth according to the produced sectional data. When the control device 44 has received sectional data from the sectional data producing device 42, the control device 44 operates the powder layer forming unit 20 to form a powder layer in the object forming section 10, and operates the curable liquid supply unit 30 to supply the curable liquid to the powder layer according to the sectional data while the supplied curable liquid is irradiated with UV light. Consequently, the curable liquid is cured to bind the powder particles by the UV light, thereby forming a thin plate (cross-sectional member) corresponding to sectional data for a single layer in the object forming section 10. After the single layer of the cross-sectional member has been formed, a bottom driving section 16 drives the bottom portion 14 to move down slightly. Then, the control device 44 receives the next sectional data from the sectional data producing device 42, and another powder layer is formed on the powder layer in which the cross-sectional member has been formed. The curable liquid is supplied to the newly formed powder layer and irradiated with UV light to form a new cross-sectional member. Once the control device 44 receives sectional data for a layer from the sectional data producing device 42, the control device 44 operates the object forming section 10, the powder layer forming unit 20, the curable liquid supply unit 30, and the UV light emitting unit 50 to form the cross-sectional members one on top of another.

The sectional data producing device 42 can be a known computer including a CPU, a ROM, a RAM, and a hard disk among which data are interactively communicated. The control device 44 can be a dedicated IC chip that converts the sectional data and produces driving signals transmitted to the object forming section 10, the powder layer forming unit 20, and the curable liquid supply unit 30. Such conversion may be performed with a CPU, a ROM, a RAM, or the like. In this instance, the computer acting as the sectional data producing device 42 may include the function of the control device 44; hence, the sectional data producing device 42 and the control device 44 may be integrated in one body.

The object forming section 10 includes a frame 12 in a rectangular shape when viewed from above, a bottom 14 disposed as the underside of the frame 12 for reciprocal sliding movement in the vertical direction, and a bottom driving section 16 driving the bottom portion 14 for vertically reciprocal sliding movement. The three-dimensional object is formed in the space defined by the frame 12 and the bottom portion 14. The bottom driving section 16 is controlled by the control device 44 so that the bottom portion 14 can accurately move in the vertical direction.

The powder layer forming unit 20 includes a hopper 22 in which the powder is contained, a powder feed roller 24 that is rotated at the lower position of the hopper 22 to feed the powder by a predetermined amount, and a spreading roller 26 that spreads the powder fed from the powder feed roller 24 to a predetermined thickness to form a powder layer. The hopper 22, the powder feed roller 24, and the spreading roller 26 are disposed so as to extend in the direction perpendicular to the sheet of FIG. 1 (Y direction) and the entirety of the powder layer forming unit 20 is disposed for reciprocal movement in the lateral direction (X direction) in FIG. 1.

For forming a powder layer, the powder layer forming unit 20 is first moved to the left end of FIG. 1. At this point, the bottom driving section 16 drives the bottom portion 14 to move down (in the minus Z direction) by a height equivalent to the thickness of the powder layer to be formed. While the powder feed roller 24 is rotated to feed the powder in front of the spreading roller 26, the powder layer forming unit 20 is moved in the lateral direction (plus X direction). The spreading roller 26 is rotated in the direction opposite to the movement of the powder layer forming unit 20. Thus, the spreading roller 26 moves while flicking excess powder in the moving direction. Consequently, a powder layer having a uniform thickness is formed at the back of the roller. The powder feeding rate is appropriately controlled according to the thickness of the powder layer and the moving speed of the powder layer forming unit 20. The rotation speed of the spreading roller 26 is also controlled according to the moving speed of the powder layer forming unit 20. Thus, the powder can be constantly spread by an appropriate amount while excess powder is flicked in the moving direction. Consequently, excess powder is prevented from being pressed.

The curable liquid supply unit 30 includes an ejection head 32 ejecting the curable liquid and a container 34 in which the curable liquid is accommodated, so that the curable liquid supply unit 30 ejects the curable liquid contained in the container 34 to the powder layer from the curable liquid ejection head 32.

The curable liquid ejection head 32 used in the present embodiment is of piezoelectrically driven type. The piezoelectrically driven liquid ejection head has a pressure chamber provided with tiny nozzle holes. The pressure chamber is filled with the curable liquid. A piezoelectric element bends the side wall of the pressure chamber to eject the liquid in droplets in an amount equivalent to the volume reduced by bending the side wall of the pressure chamber. In the curable liquid supply unit 30 of the present embodiment, the curable liquid contained in the curable liquid container 34 is delivered to the pressure chamber of the curable liquid ejection head 32 and is ejected in droplets by driving the piezoelectric element.

The curable liquid used herein is a mixture of a liquid resin material mainly composed of a monomer and an oligomer formed by combining monomers, and a polymerization initiator that is excited to acts on the monomer or the oligomer by irradiation with UV light and thus initiates polymerization. In order to prepare a curable liquid having such a viscosity as can be ejected in droplets from the piezoelectrically driven liquid ejection head, a monomer having a relatively low molecular weight is selected as the monomer of the curable liquid, and the number of the monomers in a molecule of the oligomer is also adjusted to several molecules. Since the curable liquid is stable unless it is exposed to UV light, it is not cured in the curable liquid container 34 or the curable liquid ejection head 32. Thus, the curable liquid is ejected in droplets. When the curable liquid is exposed to UV light to excite the polymerization initiator, monomers are polymerized with each other to grow into an oligomer, and oligomers are polymerized at some sites. Thus, the curable liquid is rapidly cured into a solid.

A different type of polymerization initiator from that of the curable liquid is attached on the surfaces of the powder particles. When the polymerization initiator on the surfaces of the powder particles comes into contact with the curable liquid, the polymerization initiator acts on the monomer or the oligomer to initiate polymerization. Hence, the curable liquid supplied to the powder layer not only permeates the powder layer, but also comes into contact with the polymerization initiator on the surfaces of the powder particles and is cured. As a result, the powder particles of the portion to which the curable liquid has been applied is bound by the cured liquid.

The curable liquid ejection head 32 can move in the X direction (lateral direction in FIG. 1) and the Y direction (direction perpendicular to the sheet of FIG. 1) independently of the powder layer forming unit 20 under control of the control device 44. This will be described later with reference to another figure.

The UV light emitting unit 50 includes a narrow UV light emitting lamp extending in the Y direction (direction perpendicular to the sheet of FIG. 1) and a UV light shield covering three sides of the UV light emitting lamp so that UV light is emitted only downward. The UV light emitting unit 50 is turned on or off according to the control of the control device 44, and is also moved in the X direction (lateral direction in FIG. 1) together with the powder layer forming unit 20 and the curable liquid supply unit 30, thus uniformly irradiating the entire surface of the powder layer with UV light.

Figure 2A:
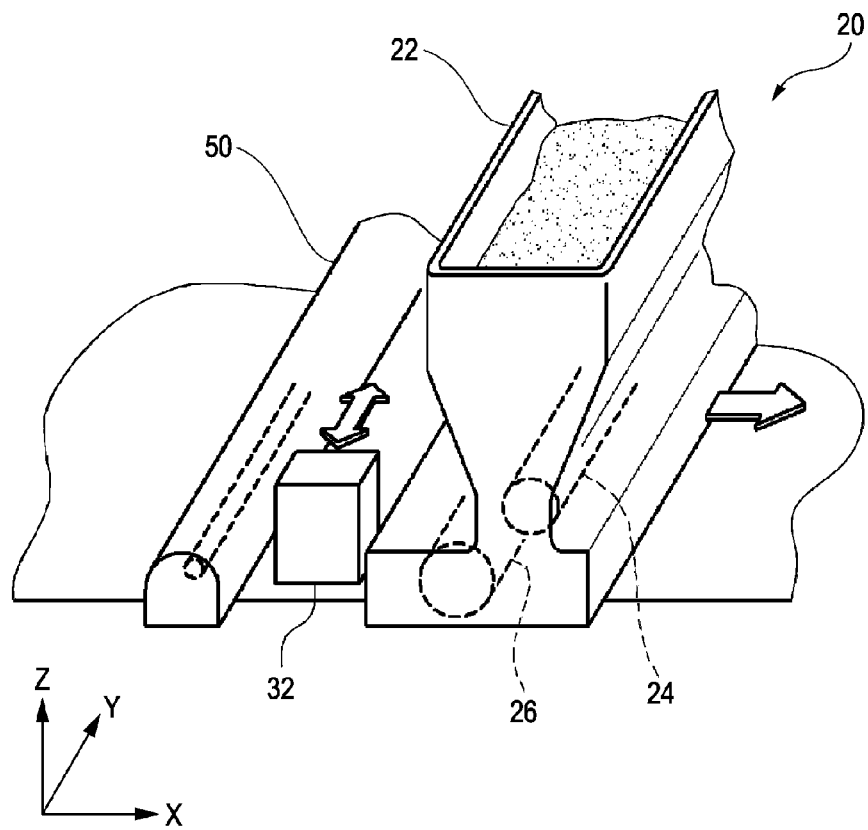
FIG. 2A is a perspective view of the arrangement of a powder layer forming unit, a curable liquid ejection head, and a UV light emitting unit of the three-dimensional object forming apparatus according to the first embodiment.
Figure 2B:
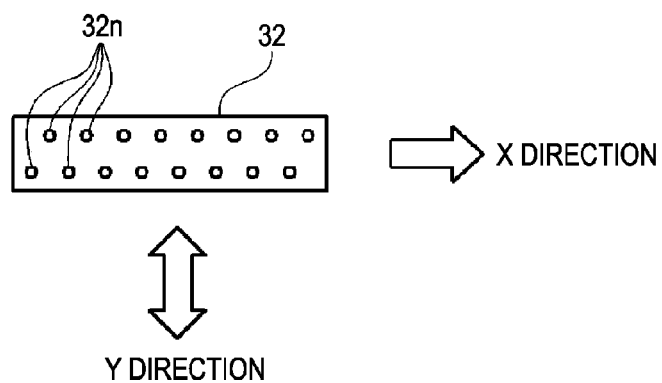
FIG. 2B is a schematic diagram of the bottom of the curable liquid ejection head having ejection nozzles.

FIG. 2A is a fragmentary perspective view of the three-dimensional object forming apparatus 100 according to the present embodiment, showing the arrangement of the powder layer forming unit 20, the curable liquid ejection head 32, and the UV light emitting unit 50. As shown in FIG. 2A, the powder layer forming unit 20 and the UV light emitting unit 50 each extend in the Y direction, and the curable liquid ejection head 32 is disposed between the powder layer forming unit 20 and the UV light emitting unit 50. The curable liquid ejection head 32 is disposed for reciprocal movement in the Y direction, including ejection nozzles through which the curable liquid is ejected at the bottom side (powder layer side). FIG. 2B shows the ejection nozzles 32n provided at the bottom of the curable liquid ejection head 32. As shown in FIG. 2B, the ejection nozzles 32n are arranged at constant intervals at the bottom of the curable liquid ejection head 32. The curable liquid ejection head 32 ejects the curable liquid in droplets while being moved in the Y direction, and thus the droplets of the curable liquid land on a plurality of lines.

Figure 3A:
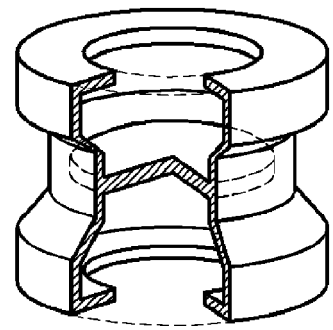
FIGS. 3A and 3B are representations of the formation of a three-dimensional object by the three-dimensional object forming apparatus.
Figure 3A:
Figure 3B:
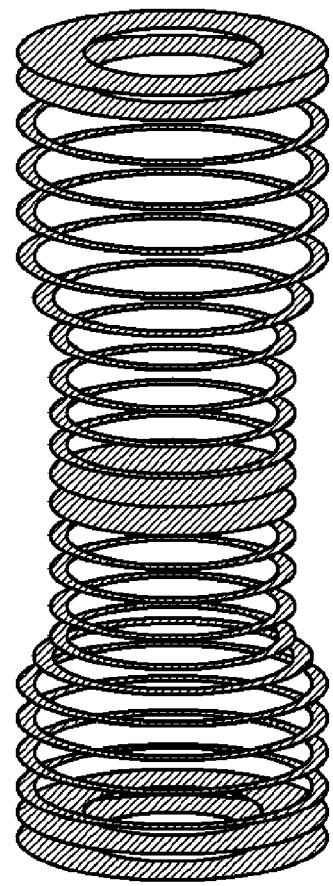

FIGS. 3A and 3B are schematic representations of a three-dimensional object that the three-dimensional object forming apparatus 100 are forming. For forming a three-dimensional object, three-dimensional data of the intended object must be stored in advance. FIG. 3A conceptually shows the shape data of a three-dimensional object to be formed. In FIG. 3A, the three-dimensional object to be formed has a tubular shape whose width is reduced to some extent at the middle portion and has circular windows in the middle of the top and bottom surfaces. In the tubular shape, a partition plate is provided for vertically dividing the inside of the tubular shape. If the three-dimensional object is cut into a plurality of cross sections in parallel with the top or bottom surface, sectional data as shown in FIG. 3B is obtained. Although the intervals between the cross sections are not necessarily constant, the cross sections are taken at constant intervals in the present embodiment. Such sectional data is produced by the sectional data producing device 42, and the resulting sectional data are transmitted to the control device 44.

The control device 44 operates the forming section 10 and the powder layer forming unit 20 to form a powder layer and operates the curable liquid ejection head 32 according to the sectional data received from the sectional data producing device 42 to eject the curable liquid to the powder layer. As described above, the curable liquid ejection head 32 is of piezoelectrically driven type, which is used for ink jet printers, and ejects droplets while being accurately positioned in the X and Y directions by the control device 44. Hence, the curable liquid ejection head can ejects the curable liquid to accurate positions at the surface of the powder layer according to the sectional data. Thus, cross-sectional members are formed as designated by the sectional data. Such operation is repeated to stack the cross-sectional members, thus forming a three-dimensional object according to the three-dimensional shape data.

However, the droplets ejected to the powder layer not only permeate in the depth direction, but also diffuse around. Accordingly, the resulting three-dimensional object has rough surfaces. If the size of the droplets is reduced to prevent the droplets from diffusing around, the droplets do not permeate sufficiently in the depth direction, and the cross-sectional members cannot be bound together. From the viewpoint of this disadvantage, the three-dimensional object forming apparatus 100 of the present embodiment forms a three-dimensional object having smooth surfaces by ejecting the curable liquid according to the following method.

B-1: Method for Forming According to the First Embodiment

Figure 4:
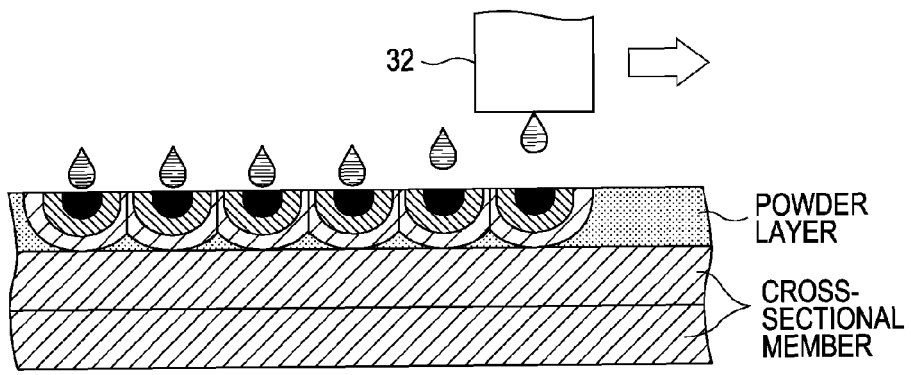
FIG. 4 is a schematic representation of the general way how droplets are ejected to a powder layer to form a three-dimensional object.

For the sake of easy understanding, a general ejection method will first be described. FIG. 4 is a representation of the general way how droplets are ejected to a powder layer to form a three-dimensional object. In this figure, a powder layer is formed on cross-sectional members formed by binding powder particles with a curable liquid, and the curable liquid is ejected in droplets to the powder layer from an ejection head 32. The droplets landing on the surface of the powder layer permeate in the depth direction and diffuse around. Since a polymerization initiator is applied onto the surfaces of the powder particles as described above, the curable liquid permeates the powder layer and besides starts polymerization at the sites coming into contact with the polymerization initiator on the surfaces of the powder particles. In FIG. 4, the portions first permeated by droplets of the curable liquid are represented by black areas, and the portions to which the curable liquid diffuses are represented by fine oblique lines. The portions to which the curable liquid further diffuses are represented by coarse oblique lines.

The curable liquid is absorbed into the powder layer through spaces among the powder particles by gravity to some extent, and by capillary action predominantly. A droplet of the curable liquid permeates so as to form substantially a hemisphere from the landing point, as shown in FIG. 4. In order to bind the powder layer formed as the uppermost layer with the underlying cross-sectional member tightly, relatively large droplets of the curable liquid must be ejected so as to reach the bottom of the powder layer (upper surface of the cross-sectional member). Consequently, the droplets spread around widely and cause a rough surface. If the curable liquid were allowed to permeate selectively downward, rough surfaces could be prevented. However, the curable liquid predominantly permeates the powder layer by capillary action that allows the curable liquid to permeate through spaces among the powder particles. The spaces among the powder particles cannot be eliminated. Accordingly, the three-dimensional object forming apparatus 100 of the present embodiment ejects the curable liquid by the following technique.

Figure 5A:
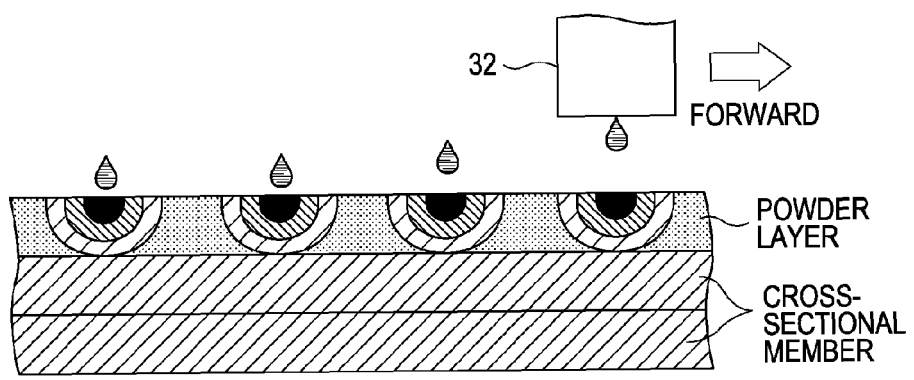
FIGS. 5A and 5B are schematic representations of the way how the three-dimensional object forming apparatus of the first embodiment ejects droplets to a powder layer to form a three-dimensional object.
Figure 5B:
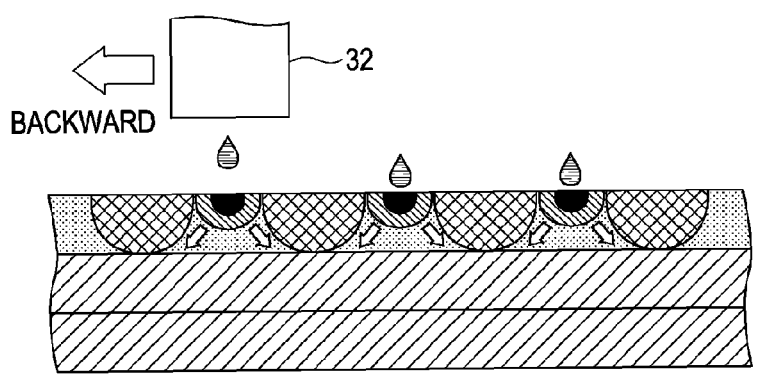

FIGS. 5A and 5B are representations of the way how the three-dimensional object forming apparatus 100 ejects droplets to a powder layer to form a three-dimensional object. As shown in FIGS. 5A and 5B, the three-dimensional object forming apparatus 100 ejects droplets in several series, so that curable liquid can be allowed to permeate predominantly downward because of the reasons below. As a result, the surface roughness is reduced according to how much the diffusion in the lateral direction is reduced. This will now be described in detail with reference to FIGS. 5A and 5B.

First, the three-dimensional object forming apparatus 100 ejects droplets to positions at intervals, as shown in FIG. 5A. At this point, the ejected droplets do not necessarily reach the bottom of the powder layer, and accordingly small droplets can be ejected. Each ejected droplet is allowed to permeate through spaces among the powder particles by capillary action and diffused substantially in a hemisphere to come into contact with the polymerization initiator on the surfaces of the powder particles. Thus, polymerization is started. FIG. 5A shows the ejected small droplets permeating the powder layer.

Then, the curable liquid is ejected to other positions between the positions where the curable liquid has been ejected in the previous series of ejection. FIG. 5B shows droplets of the curable liquid ejected to the positions between the positions where the curable liquid has been ejected in a previous series. As described with reference to FIG. 5A, the droplets ejected in the previous series have initiated polymerization in the powder layer, and are cured. In FIG. 5B, the portions of the powder layer where the previously ejected curable liquid are curing are represented by hatching (grids). In the portions hatched with grids, the spaces among the powder particles are filled with the curable liquid, and the droplets ejected in a subsequent series of ejection cannot permeate those portions. Thus, the droplets predominantly permeate downward, and consequently, the subsequently ejected curable liquid rapidly reaches the bottom of the powder layer, and goes under the portions where the previously ejected curable liquid has been cured. Thus, the entire powder layer is cured to yield another cross-sectional member on the previously formed cross-sectional member.

In the method for forming a three-dimensional object of the present embodiment, an amount of curable liquid required for a sequence of movement of the curable liquid ejection head 32 over the powder layer is ejected in several times (twice, in the above embodiment). The droplets of the first sequence of ejection do not necessarily bind the bottom of the powder layer as long as droplets of subsequent ejection can bind the bottom. Thus, the size of droplets can be reduced, and small droplets of the curable liquid can be prevented from diffusing widely in the lateral direction. In addition, the droplets ejected in a previous series of ejection interfere with the course of the droplets ejected in a subsequent series of ejection. The subsequently ejected droplets do not diffuse widely, and consequently permeate predominantly in the depth direction. Although the previously ejected droplets permeate in the lateral direction as well as in the depth direction, the subsequently ejected droplets are prevented from diffusing in the lateral direction and can permeate in the depth direction. Thus, the droplets can predominantly permeate in the depth direction as a whole. As a result, the surface roughness of the three-dimensional object can be prevented and the resulting three-dimensional object can have smooth surfaces.

Second Embodiment

A second embodiment will now be described in the following order, and the second embodiment mainly describes the control of the curing rate of the curable liquid:

A-2: Structure of the apparatus according to the second embodiment

B-2: Method for forming according to the second embodiment

A-2: Structure of the Apparatus According to the Second Embodiment

Figure 6:
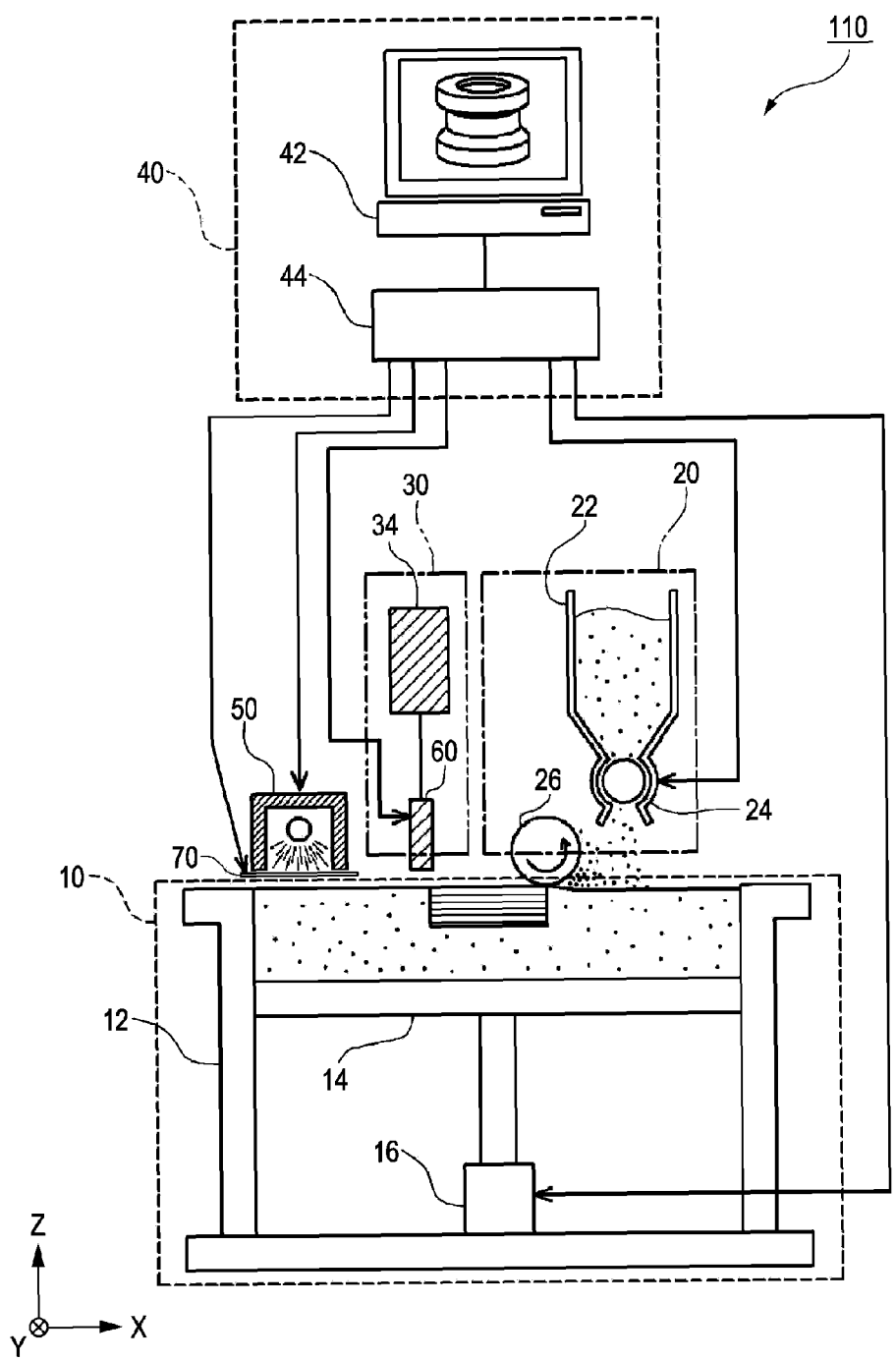
FIG. 6 is a schematic representation of the structure of a three-dimensional object forming apparatus according to a second embodiment of the invention.

FIG. 6 is a schematic representation of the general structure of a three-dimensional object forming apparatus 110 according to the second embodiment of the invention. As shown in FIG. 6, the three-dimensional object forming apparatus 110 includes an object forming section 10 defined by a large frame in which a three-dimensional object is formed, a powder layer forming unit 20 forming a powder layer of a powder in the object forming section 10, a curable liquid supply unit 30 supplying a curable liquid for binding powder particles to the powder layer, a curing rate controller controlling the curing rate of the curable liquid supplied to the powder layer, and an arithmetic processing section 40 performing various calculations to control all the operations of the three-dimensional object forming apparatus 110.

In the present embodiment, a UV curable liquid that is cured by irradiation with UV light is used as the curable liquid. The curing rate controller includes a UV light emitting unit 50 that irradiates the UV curable liquid with UV light, and a UV retarding member 70 that retards the transmission of UV light between the UV light emitting unit 50 and the powder layer.

The arithmetic processing section 40 includes a sectional data producing device 42 that stores the shape data of an intended three-dimensional object to be formed and produces sectional data at each of a plurality of cross sections of the intended three-dimensional object, and a control device 44 that controls the operations of the forming section 10, the powder layer forming unit 20, the curable liquid supply unit 30, the UV light emitting unit 50, the retarding member 70, and so forth according to the produced sectional data. When the control device 44 has received sectional data from the sectional data producing device 42, the control device 44 operates the powder layer forming unit 20 to form a powder layer in the object forming section 10, and operates the curable liquid supply unit 30 to supply the UV curable liquid to the powder layer according to the sectional data while the supplied UV curable liquid is irradiated with UV light emitted from the UV light emitting unit 50. Consequently, the UV curable liquid is cured to bind the powder particles, thereby forming a thin plate (cross-sectional member) corresponding to sectional data of a single layer in the forming section 10. After the single layer of the cross-sectional member has been formed, a bottom driving section 16 drives the bottom portion 14 to move down slightly. Then, the control device 44 receives the next sectional data from the sectional data producing device 42, and another powder layer is formed on the powder layer in which cross-sectional member has been formed. The UV curable liquid is supplied to the newly formed powder layer and irradiated with UV light to form a new cross-sectional member. Thus, the control device 44 receives sectional data of each layer from the sectional data producing device 42, and then operates the object forming section 10, the powder layer forming unit 20, the curable liquid supply unit 30, the UV light emitting unit 50, and the retarding member 70 to form the cross-sectional members one on top of another.

The sectional data producing device 42 can be a known computer including a CPU, a ROM, a RAM, and a hard disk among which data are interactively communicated. The control device 44 can be a dedicated IC chip that converts the sectional data and produces driving signals transmitted to the object forming section 10, the powder layer forming unit 20, and the curable liquid supply unit 30. Such conversion may be performed with a CPU, a ROM, a RAM, or the like. In this instance, the computer acting as the sectional data producing device 42 may include the function of the control device 44; hence, the sectional data producing device 42 and the control device 44 may be integrated in one body.

The object forming section 10 includes a frame 12 in a rectangular shape when viewed from above, a bottom portion 14 disposed as the underside of the frame 12 for reciprocal sliding movement in the vertical direction, and a bottom driving section 16 driving the bottom portion 14 for the vertically reciprocal sliding movement. The three-dimensional object is formed in the space defined by the frame 12 and the bottom portion 14. The bottom driving section 16 is controlled by the control device 44 so that the bottom portion 14 can accurately move in the vertical direction.

The powder layer forming unit 20 includes a hopper 22 in which the powder is contained, a powder feed roller 24 that is rotated at the lower position of the hopper 22 to feed the powder by a predetermined amount, and a spreading roller 26 that spreads the powder fed from the powder feed roller 24 to a predetermined thickness to form a powder layer. The hopper 22, the powder feed roller 24, and the spreading roller 26 are each disposed so as to extend in the direction perpendicular to the sheet of FIG. 6 (Y direction) and the entirety of the powder layer forming unit 20 is disposed for reciprocal movement in the lateral direction (X direction) in FIG. 6.

For forming a powder layer, the powder layer forming unit 20 is first moved to the left end of FIG. 6. At this point, the bottom driving section 16 drives the bottom portion 14 to move down (in the minus Z direction) by a height equivalent to the thickness of the powder layer to be formed. While the powder feed roller 24 is rotated to feed the powder in front of the spreading roller 26, the powder layer forming unit 20 is moved in the lateral direction (plus X direction). The spreading roller 26 is rotated in the direction opposite to the movement of the powder layer forming unit 20. Thus, the spreading roller 26 moves while flicking excess powder in the moving direction. Consequently, a powder layer having a uniform thickness is formed at the back of the roller. The powder feeding rate is appropriately controlled according to the thickness of the powder layer and the moving speed of the powder layer forming unit 20. The rotation speed of the spreading roller 26 is also controlled according to the moving speed of the powder layer forming unit 20. Thus, the powder can be constantly spread by an appropriate amount while excess powder is flicked in the moving direction. Consequently, an excess powder is prevented from being pressed.

The curable liquid supply unit 30 includes a head unit 60 including a plurality of curable liquid ejection heads 61 (see FIG. 8), and a curable liquid container 34 in which the UV curable liquid is contained. The head unit 60 is disposed so as to extend in the Y direction (direction perpendicular to the sheet of FIG. 6) and ejects curable liquid contained in the curable liquid container 34 in droplets from the curable liquid ejection heads 61 to the powder layer.

Each curable liquid ejection head 61 used in the present embodiment is of piezoelectrically driven type. The piezoelectrically driven liquid ejection head has a pressure chamber provided with tiny nozzle holes. The pressure chamber is filled with the liquid. A piezoelectric element bends the side wall of the pressure chamber to eject the liquid in droplets in an amount equivalent to the volume reduced by bending the side wall of the pressure chamber. In the curable liquid supply unit 30 of the present embodiment, the UV curable liquid contained in the curable liquid container 34 is delivered to the pressure chambers of the curable liquid ejection heads 32 and is ejected in droplets by driving the piezoelectric element.

The UV curable liquid used herein is a mixture of a liquid resin material mainly composed of a monomer and an oligomer formed by combining monomers, and a polymerization initiator that is excited to acts on the monomer or the oligomer by irradiation with UV light and thus initiates polymerization. In order to prepare a UV curable liquid having such a viscosity as can be ejected in droplets from the piezoelectrically driven liquid ejection head, a monomer having a relatively low molecular weight is selected as the monomer of the UV curable liquid, and the number of the monomers in a molecule of the oligomer is also adjusted to several molecules. Since the UV curable liquid is stable unless it is exposed to UV light, it is not cured in the curable liquid container 34 or the curable liquid ejection heads 61. Thus, the UV curable liquid is ejected in droplets. When the UV curable liquid is exposed to UV light to excite the polymerization initiator, monomers are polymerized with each other to grow into oligomers, and oligomers are polymerized at some sites. Thus, the curable liquid is rapidly cured into a solid.

A different type of polymerization initiator from that of the UV curable liquid is attached on the surfaces of the powder particles. When the polymerization initiator on the surfaces of the powder particles comes into contact with the UV curable liquid, the polymerization initiator acts on the monomer or the oligomer to initiate polymerization. Hence, the UV curable liquid supplied to the powder layer not only permeates the powder layer, but also comes into contact with the polymerization initiator on the surfaces of the powder particles and is cured. As a result, the powder particles of the portion to which the UV curable liquid has been applied is bound by the cured liquid.

The curable liquid ejection head unit 60 can move in the X direction (lateral direction in FIG. 6) independently of the powder layer forming unit 20 under control of the control device 44. This will be described later with reference to another figure.

The UV light emitting unit 50 includes a narrow UV light emitting lamp extending in the Y direction (direction perpendicular to the sheet of FIG. 6) and a UV light shield covering three sides of the UV light emitting lamp so that UV light is emitted only downward. The UV light emitting unit 50 is turned on or off according to the control of the control device 44, and is also moved in the X direction (lateral direction in FIG. 6) together with the powder layer forming unit 20 and the curable liquid supply unit 30, thus uniformly irradiating the entire surface of the powder layer.

The UV retarding member 70 is made of a material retarding the transmission of UV light. Examples of the UV transmission retarding material include oxides such as titanium oxide and zinc oxide, plastics containing a benzotriazole-based substance or a hindered amine-based substance, and plastics containing light-absorbable carbon or black pigment. The retarding member 70 may have rough surfaces so as to reflect UV light. The UV retarding member 70 is disposed between the UV light emitting unit 50 and the powder layer. In the present embodiment, the retarding member 70 is such a large plate that can cover the UV light shield along the Y direction (direction perpendicular to the sheet of FIG. 6). The retarding member 70 is moved with the UV light emitting unit 50 in the X direction (lateral direction in FIG. 6) by the control of the control device 44. The retarding member 70 includes a reclosable shutter that opens or closes depending on the control of the control device 44. When the shutter is closed, the shutter retards the transmission of UV light emitted from the UV light emitting unit 50; when the shutter is open, the UV light passes through the open window of the shutter to irradiate the powder layer. In the present embodiment, the retarding member 70 has a plurality of shutters at predetermined positions, and the shutters are opened or closed by the control of the control device 44.

Figure 7:
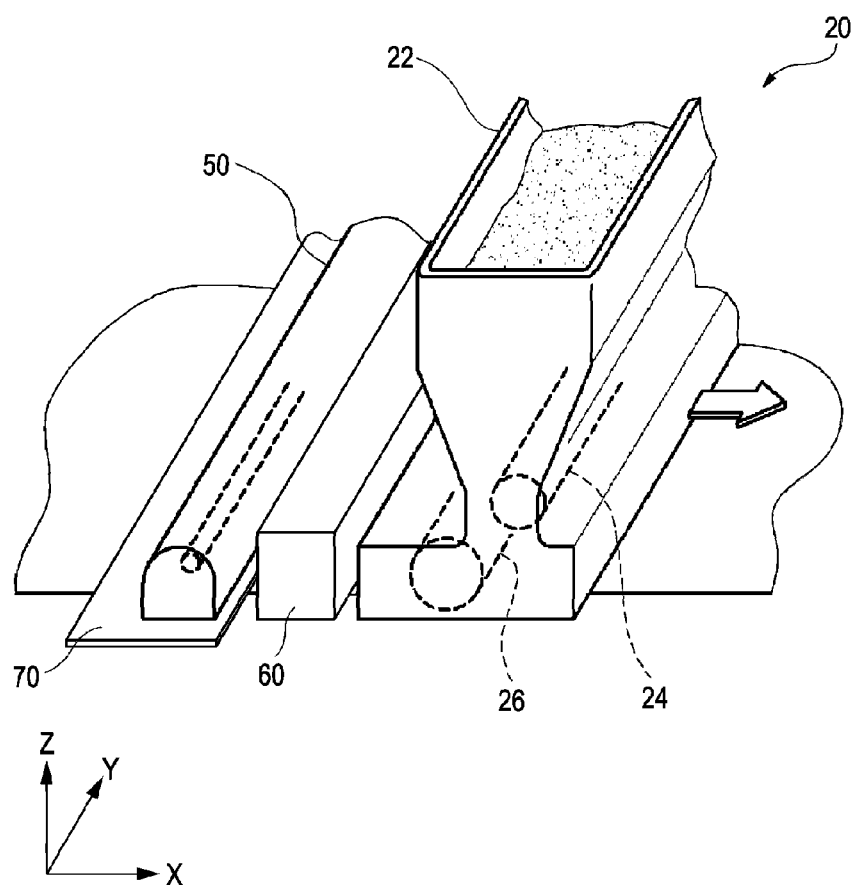
FIG. 7 is a perspective view of the arrangement of a powder layer forming unit, a head unit, a UV light emitting unit, and a UV retarding member of the three-dimensional object forming apparatus according to the second embodiment.
Figure 8:
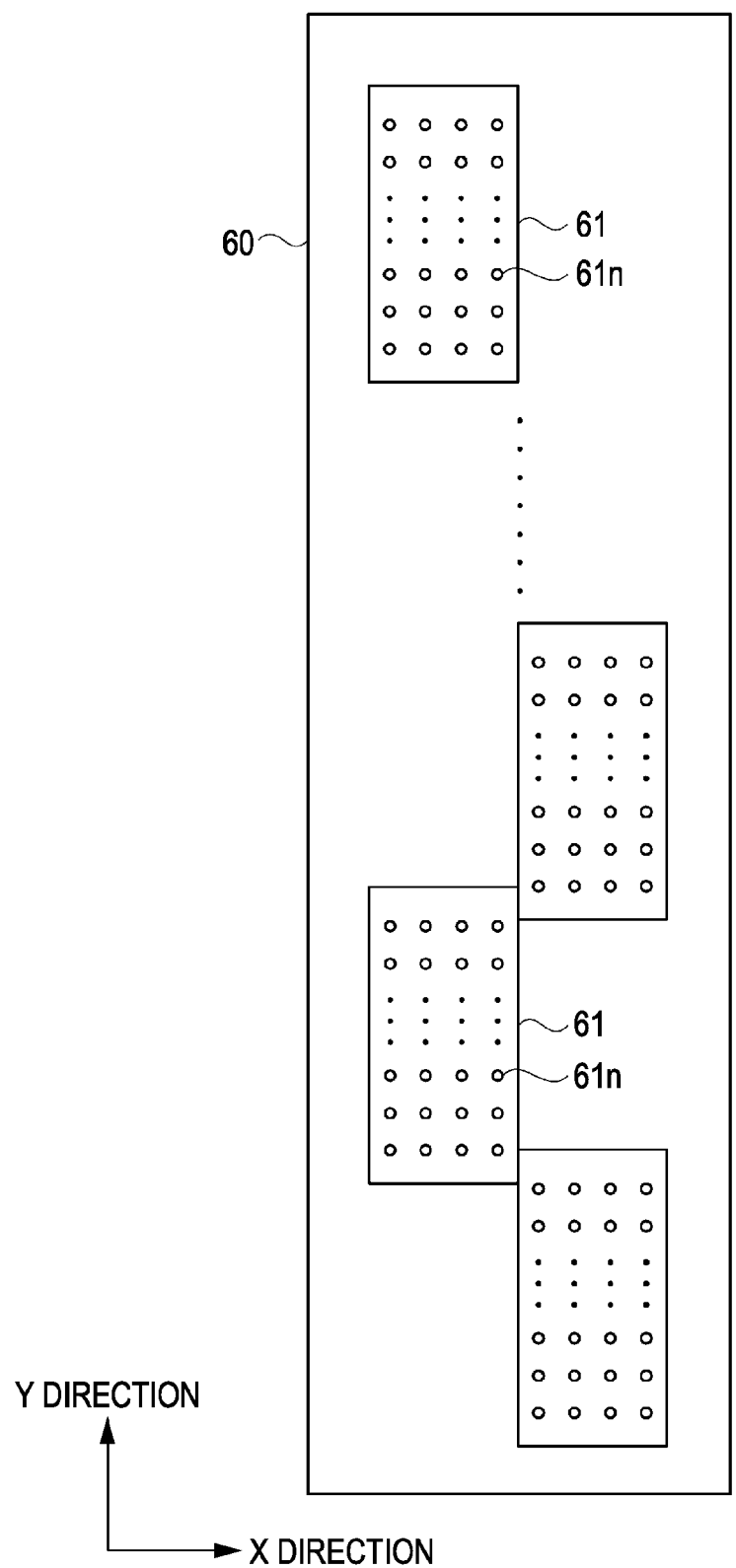
FIG. 8 is a plan view of the head unit in the three-dimensional object forming apparatus of the second embodiment.

FIG. 7 is a fragmentary perspective view of the three-dimensional object forming apparatus 110 according to the present embodiment, showing the arrangement of the powder layer forming unit 20, the head unit 60, the UV light emitting unit 50, and the retarding member 70. As shown in FIG. 7, the powder layer forming unit 20 and the UV light emitting unit 50 extend in the Y direction, and the head unit 60 is disposed between the powder layer forming unit 20 and the UV light emitting unit 50. The head unit 60 extends in the Y direction so as to eject the UV curable liquid to the powder layer in the Y direction without reciprocal movement in the Y direction. FIG. 8 shows the head unit 60 in plan view. The head unit 60 includes a plurality of curable liquid ejection heads 61, and each curable liquid ejection head 61 has a plurality of ejection nozzles 61n. As shown in FIG. 8, the plurality of ejection nozzles 61n of the curable liquid ejection head 61 are arranged at constant intervals so as to eject the UV curable liquid to a wide area of the powder layer in one operation of ejection.

The three-dimensional object forming apparatus 110 of the present embodiment also processes data of the three-dimensional object to be formed. The data processing is performed in the same manner as in the first embodiment and is described with reference to FIGS. 3A and 3B. The same description will be omitted.

For forming the three-dimensional object, the characteristics of the resulting three-dimensional object may be varied by the variation in curing rate of the UV curable liquid and cause breakage or deformation. Accordingly, the three-dimensional object forming apparatus 110 of the present embodiment can control the curing rate of the UV curable liquid in the forming process.

B-2: Method for Forming According to the Second Embodiment

The method of the present embodiment is generally the same as that of the first embodiment (see FIG. 4), and the same description will be omitted.

Figure 9A:
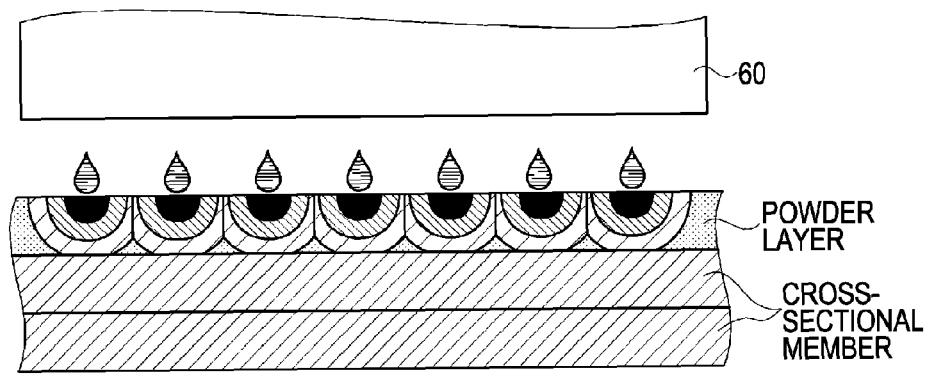
FIGS. 9A to 9C are schematic representations of the way how the three-dimensional object forming apparatus of the second embodiment ejects droplets to a powder layer to form a three-dimensional object.
Figure 9B:
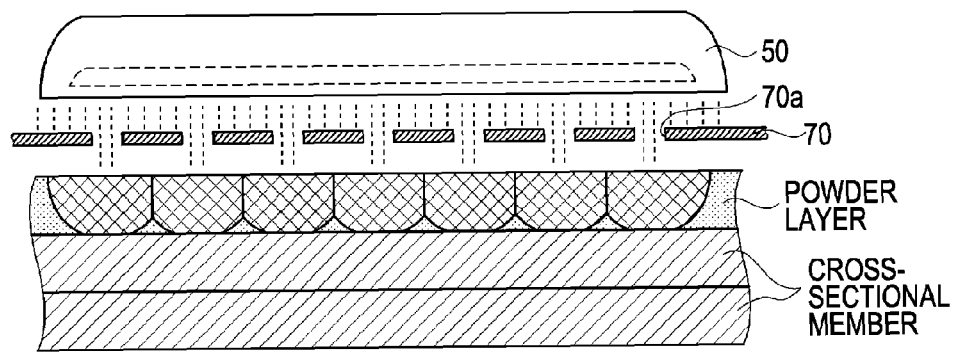
Figure 9C:
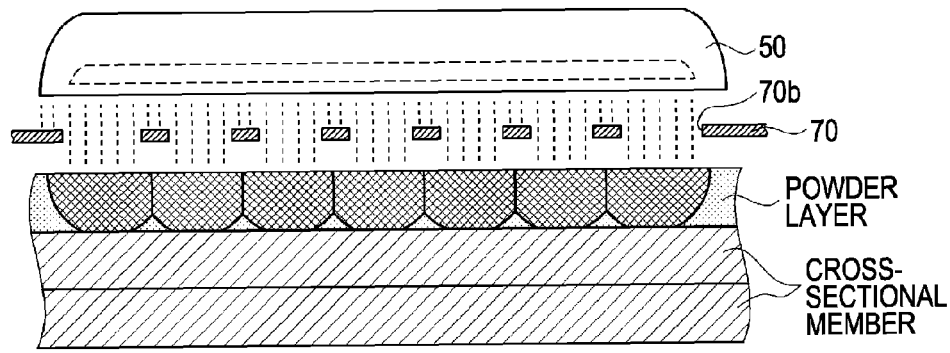

FIGS. 9A to 9C are representation of the behavior of the three-dimensional object forming apparatus 110 ejecting droplets of the UV curable liquid onto a powder layer to form a three-dimensional object.

In the method of the present embodiment, first, the powder is spread at a substantially uniform thickness to form a powder layer (powder layer forming step). Then, sectional data of the three-dimensional object is produced at each of a plurality of cross sections of an intended three-dimensional object according to the shape data of the three-dimensional object (sectional data producing step). Then, the curable liquid ejection heads, each having ejection nozzles, eject the UV curable liquid to the powder layer through the ejection nozzles according to the sectional data. Thus, the powder particles of the powder layer are bound with each other to form a cross-sectional member (cross-sectional member forming step), thereby forming a three-dimensional object.

The cross-sectional member forming step will now be described in detail. As shown in FIG. 9A, the curable liquid ejection heads 61 of the head unit 60 eject droplets of the UV curable liquid capable of being cured by irradiation with UV light to the powder layer. Since the head unit 60 includes a plurality of curable liquid ejection heads 61, the UV curable liquid can be applied to a wide area of the powder layer at one time by only one operation of ejection. The droplets ejected from the curable liquid ejection heads 61 are absorbed through spaces among the powder particles by capillary action to spread substantially in a hemisphere from and come into contact with the polymerization initiator on the surfaces of the powder particles to initiate polymerization. FIG. 9A shows the behavior of relatively small droplets permeating the powder layer.

How the curing rate of the UV curable liquid in contact with the powder layer is controlled will now be described. FIGS. 9B and 9C show states in which cross-sectional members are formed while the curing rate of the UV curable liquid is controlled. In the present embodiment, the curing rate controller that controls the curing rate of the UV curable liquid is constituted of the UV light emitting unit 50 and the retarding member 70 retarding the transmission of UV light.

Specifically, the retarding member 70 is disposed between the UV light emitting unit 50 and the powder layer onto which the UV curable liquid has been applied, as shown in FIG. 9B. The retarding member 70 has shutters including diaphragms at predetermined positions. In the present embodiment, the shutters are disposed corresponding to the regions of the powder layer to which the UV curable liquid has been applied. The diaphragms of the shutters open corresponding to the regions to which the UV curable liquid has been applied and come into a first open state in which the openings 70a are relatively small, as shown in FIG. 9B. In this instance, all the shutters corresponding to the regions to which the UV curable liquid has been applied form the same openings 70a. In this state, the UV light emitting unit 50 emits UV light to the powder layer. The UV light irradiates the powder layer to which the UV curable liquid has been applied through the openings 70a. The UV light irradiating the regions of the retarding member 70 other than the openings 70a is blocked and is not transmitted, and thus does not reach the powder layer. Hence, the first open state has a wide area of regions blocking the UV light to reduce the amount of irradiation of the powder layer with the UV light. Consequently, the UV curable liquid is cured relatively slowly.

Turning now to FIG. 9C, the diaphragms of the shutters are further opened to come into a second open state in which the openings 70b are larger. In this state, the UV light emitting unit 50 emits UV light to the powder layer. The UV light from the UV light emitting unit 50 irradiates the powder layer to which the UV curable liquid has been applied through the openings 70b. Hence, the second open state has a small area of regions blocking the UV light and accordingly increases the amount of irradiation of the powder layer with UV light. Consequently, the UV curable liquid is cured relatively rapidly.

Since the amount of UV irradiation of the UV curable liquid is small in the first open state, the curing rate of the UV curable liquid is reduced and accordingly the UV curable liquid can rapidly reach the bottom of the powder layer. Since the amount of UV irradiation of the UV curable liquid is large in the second open state, the curing rate of the UV curable liquid is increased. Accordingly the entire powder layer to which the UV curable liquid has been applied is rapidly bound and hardened, thus forming a new cross-sectional member.

The second embodiment produces the following effects in addition to those of the first embodiment:

(1) For curing the UV curable liquid applied to the powder layer with UV light emitted from the UV light emitting unit 50, a retarding member 70 is disposed between the powder layer and the UV light emitting unit 50. By changing the open state of the shutters of the retarding member 70, the amount of the irradiation of the powder layer with UV light is controlled. Thus, the curing rate of the UV curable liquid can be varied depending on the open state of the shutters of the retarding member 70.

(2) Even if, for example, the type or nature of the UV curable liquid is varied, the curing rate of the UV curable liquid can easily be controlled by controlling the amount of the UV irradiation, and the workability can be enhanced including the adjustment of conditions.

C. Modifications

The above described embodiments may be modified without particular limitation. Some of the possible modifications will be described below.

C-1: First Modification

In the first embodiment, the curable liquid ejection head 32 ejects droplets while moving forward and backward. The curable liquid may be ejected only while the curable liquid ejection head 32 is moving forward. Although highly sophisticated operation is required to eject droplets to accurate positions while the curable liquid ejection head 32 is moving backward, ejection both during backward moving and during forward moving reduces the ejection time. Hence, the three-dimensional object can be formed at a short time.

C-2: Second Modification

In the first embodiment, the curable liquid is ejected in two times to control the permeation rate of the liquid. The liquid may be ejected in more than two times. However, if the number of series of ejection is increased, the curable liquid ejection head 32 must repeat reciprocal movement many times and accordingly it takes a long time. It is preferable that the curable liquid be ejected in about two or three times.

C-3: Third Embodiment

In the first embodiment, the size of the droplets is not varied between the first series of ejection and the subsequent series of the ejection. However, the size of the droplets may be varied such that droplets ejected in the first series are smaller than those ejected in the subsequent series. The droplets of the first series of ejection tend not only to permeate in the depth direction, but also to spread in the lateral direction. In order to prevent the occurrence of rough surfaces, the droplets of the first series are preferably small. The droplets ejected in the subsequent series are prevented from spreading in the lateral direction by the previously ejected droplets and predominantly permeate in the depth direction. Therefore the subsequently ejected droplets are preferably large from the viewpoint of spreading the curable liquid over the entire powder layer including the portions under the regions to which the droplets have previously been applied, and from the viewpoint of binding another cross-sectional member to the previously formed cross-sectional member.

C-4: Forth Modification

In the first embodiment, the curable liquid ejection head 32 may be reciprocally moved in the direction intersecting the direction in which the powder layer is formed. The curable liquid is thus ejected to form the cross-sectional member. Consequently, the curable liquid can be ejected to the end of the powder layer by reciprocal movement of the curable liquid ejection head 32 immediately after the powder layer is formed, and the cross-sectional member is thus formed. Hence, the cross-sectional member can be efficiently formed in a short time even if the curable liquid is ejected from the curable liquid ejection head 32 in several series of ejection. As a result, a three-dimensional object can be rapidly formed.

C-5: Fifth Modification

While the first embodiment uses the curable liquid ejection head 32 reciprocally moves over the powder layer, a head unit constituted of a plurality of heads may be used as shown in FIG. 8 or as in the second embodiment without limiting to the structure of the first embodiment. Such a structure can also eject a plurality of droplets in several times and the droplets ejected in a subsequent series are landed between the regions to which droplets have been applied in the previous series of ejection.

C-6: Sixth Modification

Figure 10A:
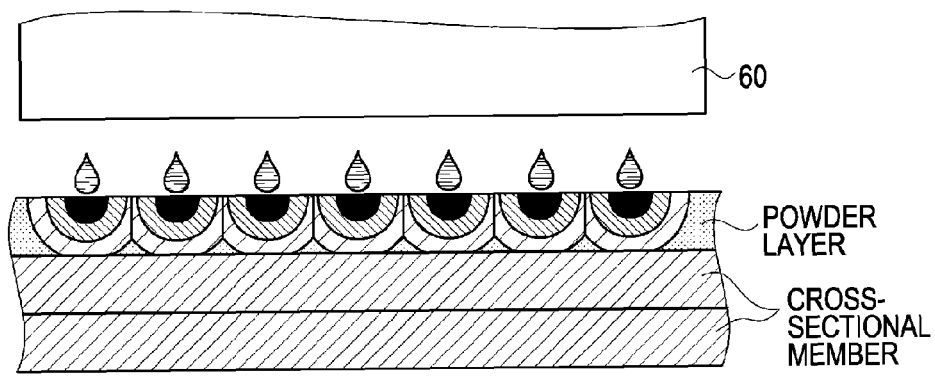
FIGS. 10A to 10C are schematic representations of the way how a three-dimensional object forming apparatus according to a modification of the embodiments ejects droplets to powder layer to form a three-dimensional object.
Figure 10B:
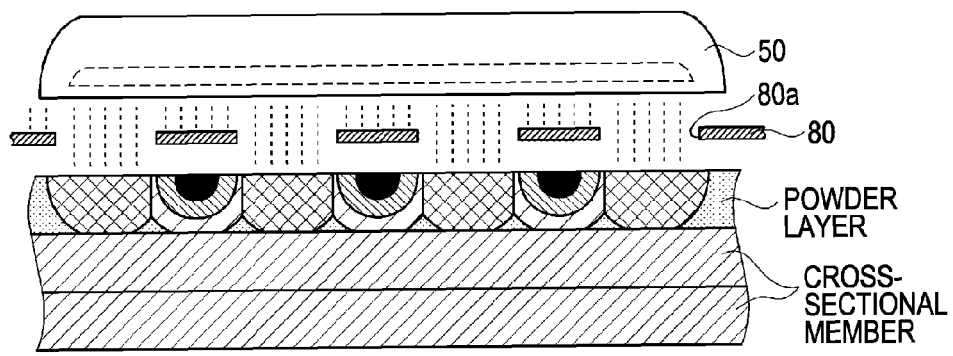
Figure 10C:
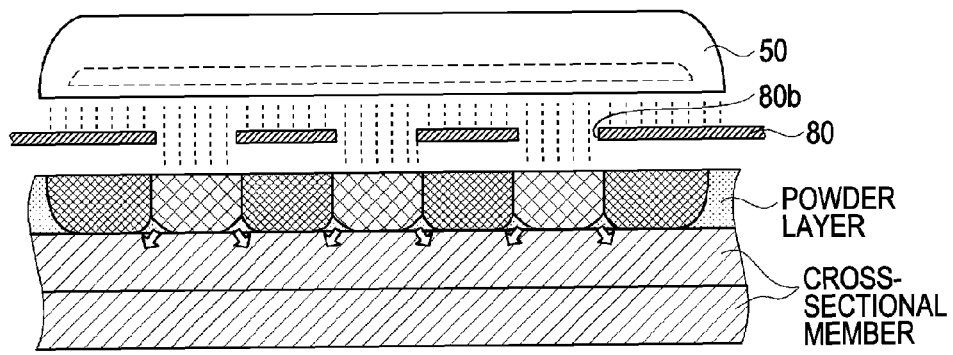

In the first embodiment, the droplets of the curable liquid may be ejected to every other position in the first series of ejection and subsequently ejected between the positions where the previously ejected droplets have been landed, thereby forming a cross-sectional member having a smooth surface. To form a smooth surface, alternatively, a retarding member retarding the transmission of UV light may be used. More specifically, a head unit 60 ejects droplets of the curable liquid to the powder layer to apply the droplets of the curable liquid, as shown in FIG. 10A. Then, as shown in FIG. 10B, a retarding member 80 is disposed between the head unit 60 and the powder layer. The retarding member 80 forms openings 80a in it corresponding to the positions where droplets have been applied every other position. In this state, the UV light emitting unit 50 emits UV light to the powder layer. The emitted UV light passes through the openings 80a to irradiate the curable liquid on and in the powder layer. The UV light irradiating the regions of the retarding member 80 other than the openings 80a is blocked and is not transmitted. Thus, the regions of the powder layer to which the curable liquid has been applied corresponding to the openings 80a are previously bound. Then, as shown in FIG. 10C, openings 80b are formed corresponding to the regions other than the regions where the curable liquid has been cured, and UV light is emitted though the openings 80b. In this technique, the curable liquid subjected to UV irradiation is prevented from spreading by the regions bound by previous irradiation, and cannot spread widely in the lateral direction. Consequently, the curable liquid predominantly permeates in the depth direction. While the curable liquid previously irradiated with UV light spreads in the lateral direction as well as permeating in the depth direction, the subsequently irradiated curable liquid is prevented from spreading in the lateral direction and predominantly permeates in the depth direction. Thus, the curable liquid can predominantly be absorbed in the depth direction as a whole. Consequently, the resulting three-dimensional object can be prevented from having rough surfaces. Thus, a three-dimensional object having smooth surfaces can be formed. Furthermore, by disposing the retarding member 80a at a desired position, the curing rate of the curable liquid can be controlled.

C-7: Seventh Modification

In the second embodiment, the curable liquid is cured by irradiation with UV light. The curable liquid is not limited to the UV curable liquid. For example, the curable liquid may be cured with IR light, visible light, or X rays. The three-dimensional object can be formed even by use of such a curable liquid.

C-8: Eighth Modification

While the second embodiment uses the retarding member to retard the transmission of UV light, a filter having different transmittances depending on the wavelength of the UV light may be used. The amount of UV irradiation can be controlled by varying the transmittance of UV light, and thus the curing rate of the UV curable liquid can be controlled.

C-9: Ninth Modification

In the second embodiment, the UV light emitting unit 50 is used as the curing rate controller. However, the curing rate controller may be a heater to heat a thermosetting liquid that can be cured by heating, without particular limitation. The curing rate of the curable liquid can be controlled even by heat control.

C-10: Tenth Modification

In the above embodiments, a UV curable liquid that can be cured at a constant rate is ejected. However, a plurality of types of curable liquid having different curing rates may be used without particular limitation. For example, the curable liquid ejected in a subsequent series of ejection may be cured at a lower rate than the curable liquid ejected in the previous series and the subsequently ejected curable liquid can be cured simultaneously with the previously ejected curable liquid. The curing rate may be thus controlled to reduce the variation in curing rate.

C-11: Eleventh Modification

While the second embodiment uses the retarding member having diaphragms, the retarding member may have a movable member to block UV light from the UV light emitting unit as required. The amount of UV irradiation may be thus controlled.

C-12: Twelfth Modification

In the second embodiment, the UV light emitting unit 50 is fixed. However, the UV light emitting unit 50 may be movable. In this instance, the UV light emitting unit can move to a desired position of the powder layer to which the UV curable liquid has been applied and emits UV light to the position. The curing rate of the UV curable liquid can thus be controlled by changing the position of the UV light emitting unit 50 with respect to the powder layer.

C-13: Thirteenth Modification

While the second embodiment uses the UV light emitting unit 50 and the retarding member 70 as the curing rate controller controlling the curing rate of the UV curable liquid, the retarding member 70 may not be necessary. In this instance, the power of UV light emitted from the UV light emitting unit 50 can be controlled by the control device 44 of the arithmetic processing section 40. The curing rate of the UV curable liquid can be controlled by varying the amount of UV irradiation.

While the invention has been described using the three-dimensional object forming apparatuses 100 and 110 according to preferred embodiments and their modifications, it will be readily appreciated by those skilled in the art that various modifications may be made without departing from the scope and spirit of the invention. A combination of the embodiments may be applied.

For example, the above embodiments use the curable liquid cured by polymerization initiated by UV light for forming the sectional member. Alternatively, the curable liquid may be immediately polymerized by coming into contact with moisture (or oxygen) in air. Such a curable liquid may be an instant adhesive.

The entire disclosure of Japanese Patent Application Nos: 2007-185316, filed Jul. 17, 2007 and 2008-142239, filed May 20, 2008 are expressly incorporated by reference herein.

What is claimed is:

1. A three-dimensional object forming apparatus forming a three-dimensional object by binding powder particles with a curable liquid, the apparatus comprising:
   a powder layer forming unit that spreads a powder to a uniform thickness to form a powder layer;
   a curable liquid election head electing the curable liquid to the powder layer, the curable liquid election head including an ejection nozzle through which the curable liquid is ejected;
   a sectional data producing device producing sectional data at each of a plurality of cross sections of an intended three-dimensional object according to shape data of the intended three-dimensional object; and
   a cross-sectional member forming section in which cross-sectional members are formed by ejecting the curable liquid to the powder layer from the curable liquid ejection head according to the sectional data and thus binding the powder layer, the cross-sectional member forming section including a permeation rate controller which is capable of varying the permeation rate of the curable liquid to the powder layer by shielding a portion of the bound powder layer and curable liquid from a means for curing the curable liquid using a shielding portion disposed in the cross-sectional member forming section,
wherein the means for curing the curable liquid is a UV light emitting unit and wherein the permeation rate controller is disposed between the UV light emitting unit and the powder layer and comprises a retarding member which includes shutters which may be opened or closed varying amounts so as to control the amount of UV light that reaches the powder layer, and
wherein the UV light emitting unit and the retarding member causes a first series of shutters to be opened so that the UV light cures the portion of the bound powder layer and curable liquid below the first series of shutters, while a second series of shutters located between the first series of shutters are closed so as to shield the UV light from the bound powder layer and curable liquid below the second series of shutters, such that the cured portion below the first series of shutters acts as a barrier so as to control the permeation of the curable liquid below the second series of shutters.

2. The three-dimensional object forming apparatus according to claim 1, wherein the curable liquid ejection head ejects the curable liquid to the powder layer while reciprocally moving over the powder layer, and the cross-sectional members are formed so as to be stacked one on top of another in the cross-sectional member forming section, and wherein the cross-sectional member forming section allows the curable liquid ejection head to eject a plurality of droplets of the curable liquid to each potion thereunder in a plurality of series of ejection while reciprocally moving, in such a manner that droplets ejected in a subsequent series of ejection are landed between droplets ejected in a previous series of ejection.

3. The three-dimensional object forming apparatus according to claim 1, wherein the curable liquid ejection head ejects droplets of the curable liquid to every other position along the moving direction thereof while reciprocally moving.

4. The three-dimensional object forming apparatus according to claim 1, wherein the curable liquid ejection head ejects droplets of the curable liquid while moving forward and moving backward.

5. The three-dimensional object forming apparatus according to claim 1, wherein the curable liquid ejection head ejects droplets of the curable liquid while reciprocally moving in the direction intersecting the direction in which the powder layer is formed.

6. The three-dimensional object forming apparatus according to claim 1, wherein the curable liquid ejection head ejects droplets of the curable liquid such that the droplets ejected in a previous series of ejection are smaller than the droplets ejected in a subsequent series of ejection.

7. The three-dimensional object forming apparatus according to claim 1, wherein the cross-sectional member forming section further includes a curing rate controller that controls the curing rate of the curable liquid ejected to the powder layer.

8. The three-dimensional object forming apparatus according to claim 1, wherein the curable liquid is cured by irradiation with electromagnetic waves, and the curing rate controller includes an electromagnetic wave emitting unit that emits electromagnetic waves to the powder layer to which the curable liquid has been applied.

9. The three-dimensional object forming apparatus according to claim 1, wherein the curing rate controller further includes a retarding member between the electromagnetic wave emitting unit and the powder layer to retard the transmission of the electromagnetic waves.

10. The three-dimensional object forming apparatus according to claim 1, wherein the curable liquid is cured by irradiation with UV light, the electromagnetic wave emitting unit emits UV light, and the shielding portion retards the transmission of UV light.

11. The three-dimensional object forming apparatus according to claim 1, wherein the curable liquid is cured by heating, and the curing rate controller includes a heater that heats the powder layer to which the curable liquid has been applied.

12. The three-dimensional object forming apparatus according to claim 1, wherein the curable liquid ejection head ejects curable liquids having different curing rates and the curable liquid ejected in a subsequent series of ejection has a lower curing rate than the curable liquid ejected in a previous series of ejection.

13. A three-dimensional object forming apparatus forming a three-dimensional object by binding powder particles with a curable liquid, the apparatus comprising:
a powder layer forming unit that spreads a powder to a uniform thickness to form a powder layer;
a curable liquid ejection head ejecting the curable liquid to the powder layer, the curable liquid ejection head including an ejection nozzle through which the curable liquid is ejected;
a sectional data producing device producing sectional data at each of a plurality of cross sections of an intended three-dimensional object according to shape data of the intended three-dimensional object;
a means for curing the curable liquid; and
a cross-sectional member forming section in which cross-sectional members are formed by ejecting the curable liquid to the powder layer from the curable liquid ejection head according to the sectional data and thus binding the powder layer,
wherein the sectional data producing device produces sectional data for a single cross section which causes the curable liquid ejection head to eject a first series of ejections of curable liquid and the means for curing the curable liquid to cure the portion of the bound powder layer and curable liquid from the first series of ejections before a second series of ejections of curable liquid are performed such that the cured portion from the first series of ejections acts as a barrier so as to control the permeation of the second series of ejections,
wherein the means for curing the curable liquid is a UV light emitting unit and wherein the permeation rate controller is disposed between the UV light emitting unit and the powder layer and comprises a retarding member which includes shutters which may be opened or closed varying amounts so as to control the amount of UV light that reaches the powder layer, and
wherein the UV light emitting unit and the retarding member causes a first series of shutters to be opened so that the UV light cures the portion of the bound powder layer and curable liquid below the first series of shutters, while a second series of shutters located between the first series of shutters are closed so as to shield the UV light from the bound powder layer and curable liquid below the second series of shutters, such that the cured portion below the first series of shutters acts as a barrier so as to control the permeation of the curable liquid below the second series of shutters.

* * * * *